Oct. 18, 1960    H. SIGLER ET AL    2,956,769
VACUUM FRAME MAT
Filed Nov. 12, 1958
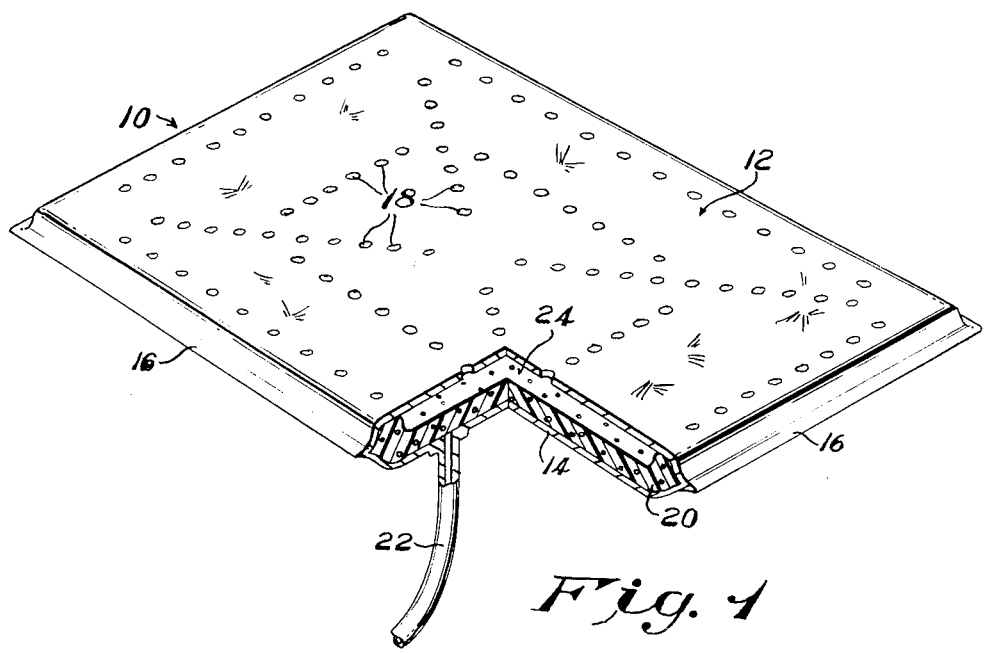
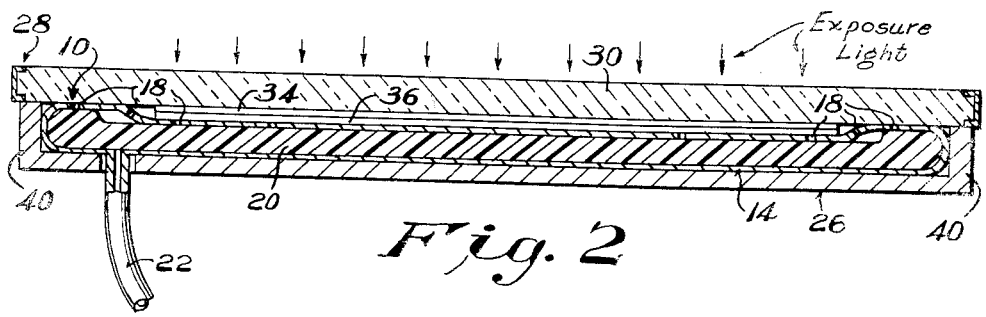
CHARLES E. DORAN
and HAROLD SIGLER
INVENTORS
BY Homer R. Montague
ATT'Y.

United States Patent Office 2,956,769
Patented Oct. 18, 1960

2,956,769

VACUUM FRAME MAT

Harold Sigler, Brooklyn, and Charles E. Doran, Wantagh, N.Y., assignors to Fairchild Camera & Instrument Corporation, a corporation of Delaware Filed Nov. 12, 1958, Ser. No. 773,300

3 Claims. (Cl. 248—363)

This invention pertains generally to vacuum frames for photographic sheet materials and the like, and more particularly to a vacuum mat for use in connection with such a frame.

It is often desirable to provide an apparatus whereby a plurality of sheet materials may be held together in intimate contact. A common example is found in the photographic art, wherein it is necessary in contact printing to achieve an intimate and fast contact between the negative or other master image bearing material and the positive or printing sheet. Once the two sheets are secured together in close contact, the positive sheet is exposed to a suitable light source through the negative image, thereby selectively exposing areas of the printing sheet in accordance with the form of the image information contained in the negative. Not only must the two sheets be held together in a manner which prevents any relative motion therebetween, but the aforementioned intimate contact must be achieved in order to obtain a clearly defined image on the positive or printing sheet. Other examples abound in the graphic arts, wherein a master sheet is required to be held in intimate contact with a second sheet in order to provide a proper image transfer between the master and the second sheet, which latter sheet may, as another example, be one of the so-called photopolymer materials characterized by the ability to be locally hardened by the action of actinic rays such as visible light or ultraviolet radiation. Such materials, of which the prior art affords many examples, can be exposed as indicated above to produce selective local hardening in accordance with the master image, and can thereafter be developed as by washing out the unhardened portions to produce a relief image suitable for matting or even for direct surface printing by letter-press, offset, or other familiar printing techniques.

Similarly, it is often desirable to provide an apparatus whereby a single sheet may be held in intimate contact with a substantially planar member, such as a pane of glass, so that an image on the sheet material may be scanned in some suitable manner, as by a scanning light ray or the like, for reproduction by an associated line-scan apparatus such as a photoelectric engraving machine. Where such a machine has a flat bed for supporting the copy material, it is generally desirable to provide a vacuum frame device on such bed for holding the copy in a flat position on such bed and for preventing relative motion between the copy material and the bed. A similar application is found in the use of copyboards in ordinary photographic reproduction.

Irrespective of the number of sheets of material which are to be held within the frame, it is generally necessary to evacuate the internal volume of the vacuum frame to the greatest practical extent in a given application, the greater the degree of evacuation of the frame the less the chance of the existence of occluded air between the sheet material and the planar member against which such sheet is held. It will be appreciated that any air pockets remaining between the negative and positive sheets in the frame or between either of these sheets and the planar glass member (in the case of an exposure frame for photographic printing or the like) will produce corresponding abberations in the image produced in the printing sheet. In addition, it is generally desirable to employ a vacuum frame which will accept sheet materials of a wide range of thickness.

The foregoing requirements of intimate contact, lack of relative motion, avoidance of occluded air and adaptability as to sheet thickness are among the results sought to be achieved by the several vacuum frames of the prior art. While many such frames have been disclosed which function in a very satisfactory manner for several given applications, it is often the case that the same requirements must be met in an apparatus which is not of an elaborate and expensive type. In order to achieve the desired results in connection with many of the vacuum frames of the prior art, rather intricate and expensive devices have been employed. While an expensive vacuum frame may not be a significant burden to the purchaser of a large and complicated photoengraver installation, such a frame may represent the major portion of the cost of a relatively simple exposure assembly. The utilization of the vacuum frames of the prior art has, as a result, often created an unnecessarily high selling price for fairly simple exposure devices employing the vacuum principle.

It is accordingly a primary object of the present invention to provide a simplified vacuum mat for a vacuum exposure frame or the like whereby intimate contact may be achieved between a substantially planar member thereof and sheet materials of a wide range of thickness, as well as between the sheets themselves, without the use of the relatively expensive devices of the prior art.

Another object of the present invention is to provide a vacuum mat for sheet materials and the like which may be employed to hold such sheet materials in intimate contact with any desired smooth and continuous surface, irrespective of whether such surface is a part of a vacuum frame or the like.

In accordance with the present invention, the above and other objects are achieved by means of a vacuum mat including an envelope member or the like of some suitable flexible material having a pair of opposing faces one of which includes a plurality of perforations. Within the envelope and substantially filling the interior thereof is a resilient compression member of a suitably porous material. The envelope is hermetically sealed except at the perforations in the one face thereof, and a fluid conduit communicates with the interior of the envelope in order that a vacuum may be drawn in the envelope by means of a suitable source of vacuum connected to such fluid conduit, a seal being effected between the perforated face of the envelope and any desired smooth and continuous surface such as the glass plate of an exposure frame. Since the resilient compression member is porous, it not only provides a cushion for the sheet materials which are positioned against the perforated face of the envelope, but it also serves as the means for distributing the vacuum (or, more correctly, partial vacuum) which is drawn through the fluid conduit over the entire perforate face of the envelope.

With the above considerations and objects in mind, the invention itself will now be described in connection with a preferred embodiment thereof given by way of example and not of limitation, and with reference to the accompanying drawings, in which:

Fig. 1 is a perspective view, partially broken away to show the internal elements, of the vacuum mat of the present invention.

Fig. 2 is a view of the vacuum mat of the present invention in place in a vacuum frame, both the frame and the mat being shown in section.

Referring now to Fig. 1 of the drawings, the vacuum mat of the present invention is shown as consisting of an envelope member 10, having two opposing faces 12 and 14. The envelope may be formed of any suitable flexible material, and the two faces thereof may preferably be separate pieces joined together in an hermetic seal 16 around the periphery of the envelope. The upper face 12 (in Fig. 1) has a relatively smooth exterior surface, and is provided with a plurality of apertures 18. As may be seen, a large number of the apertures 18 lie around the periphery of the envelope 10, but are spaced therefrom by a sufficient distance to provide a sealing surface between the row of apertures and the adjacent portion of the seal 16, as will be further described.

Lying within the envelope 10 is a compression mat or the like 20 which is formed of a suitable resilient, porous material such as an open or continuous cell sponge or the like. Compression member 20 is substantially the same volume as the interior of the envelope 10, so that the compression member substantially fills the vacuum envelope to hold the latter in the shape shown.

A fluid conduit 22, which may, for example, be a plastic hose or equivalent, communicates with the interior of the envelope 10 so that a vacuum may be drawn through conduit 22 and porous compression member 20 when the apertures 18 are closed as by the glass plate of a photographic exposure frame. It will be appreciated that the reference to the glass plate of an exposure frame is merely by way of example, and that the plate may be of some material other than glass, and also that it may be other than planar if desired. It is important, however, that the surface of such plate or the like that is adjacent to face 12 of the envelope 10 when a vacuum is attempted to be drawn therein be relatively smooth and continuous in order that a hermetic seal may be effected between such adjacent surface and the portion of face 12 which lies between the peripheral row of apertures 18 and the seal 16. Obviously, such hermetic sealing is essential to the creation of a vacuum within the envelope 10. In order to aid in the establishment of this hermetic seal between the envelope and its cooperating member, the peripheral portion of the compression member 20 is somewhat thicker than the central portion 24 of such member. Thus, as the cooperating member or plate is brought up against face 12 of the envelope, the first portions of that face to come into contact with the plate are the peripheral portions just outside the peripheral row of holes or apertures 18. A slight amount of mechanical pressure, possibly even only that produced by the weight of the cooperating plate or the like when such plate is positioned above the envelope 10, will effect the seal against the peripheral portion of the upper face of the envelope, and the desired vacuum may be drawn through conduit 22 and the porous member 20. Further, when one or more sheets of photosensitive materials or the like are positioned on top of the upper face 12 of the envelope 10, the central depressed area 24 of the compression member 20 provides a natural seat therefor.

Referring now to Fig. 2, the vacuum mat 10 of the present invention is shown inside a vacuum frame which includes a support member 26 and a movable cover or top plate 28, the latter comprising a plate 30 of glass or the like with a frame member 32 around the periphery thereof. The support member 26 has an aperture therein to accommodate the conduit 22 of the vacuum envelope 10. As may be seen, the peripheral portion of the upper face 12 of the vacuum envelope 10 bears against the under surface of the glass plate 30 to effect an hermetic seal therebetween. In keeping with the use of the apparatus of Fig. 2 as a vacuum frame for the exposure of photographic sheet materials, the upper sheet 34 positioned between the glass plate 30 and the central or depressed portion of the vacuum mat 10 may be a negative, while the lower sheet 36 may be a positive or printing paper. Light rays 38 from a suitable source of light (not shown) pass through the glass plate 30 and selectively expose areas of the positive sheet 36 in accordance with the image information contained in the negative or master sheet 34.

Referring now to the operation of the vacuum mat of the present invention, and referring particularly to the showing of Fig. 2, which includes associated vacuum frame elements which cooperate with the vacuum mat to securely hold one or more sheets of photosensitive material or the like, the vacuum envelope 10 is positioned in the support member 26, and the desired sheet materials 34 and 36 are positioned over the central depressed area of the envelope. The cover or top plate 28, which may be pivotally mounted to support member 26, is then brought down onto the vacuum mat, contacting it first at the peripheral portions thereof. With either the weight of the cover 28 pressing down sufficiently hard upon the peripheral portions of the envelope, or with a slight amount of additional mechanical pressure as from the hand of the operator of the device, a seal is effected between the peripheral portions of the envelope and the glass plate 30. A suitable source of vacuum is concurrently connected to the fluid conduit 22, and a partial vacuum is then drawn through such conduit and through the porous compression member 20 until almost all of the air formerly within the envelope 10 and the space between such envelope (at its upper face) and the under side of the glass plate 30 is drawn out. Not only does this drawing out of the air tend to remove all of the air between the two sheets 34 and 36 and between sheet 34 and the under side of plate 30, as well as between those portions of the under side of sheet 36 and the upper face of envelope 10 which are not interrupted by apertures 18, but such evacuation also forces the under side or face of envelope 10 and the plate 30 towards each other under the influence of atmospheric pressure present on the exterior surfaces of each of these members. As such action takes place, the compression member 20, through the open or continuous pores or cells of which the vacuum is drawn, is compressed between the two faces of the vacuum envelope 10, and the two faces are both drawn closer to the under side of plate 30. As a result, the two sheets 34 and 36 are securely held in intimate contact both with each other and with the plate 30.

It will usually be desirable to provide a rest for the frame member 28 in order to provide a leveling support therefor which would not ordinarily be provided by the compressed vacuum mat, and such rests are shown as the upstanding portions 40 of the support member 26 in Fig. 2. As the vacuum is drawn, the envelope 10 collapses, and the frame member 28 is lowered onto the rests 40.

The invention has been described above in some detail, and particularly with respect to its application to vacuum frames and the like for use in connection with photographic processes. However, it will be apparent to those skilled in the art that the invention is equally applicable to other arts wherein it is desired to hold a sheet of material in intimate contact with a smooth and continuous surface (whether opaque or not), or where it is desired to hold together in intimate contact two or more sheets. For example, the apparatus of the present invention may be employed to hold together a plurality of sheets which are to be laminated together by a suitable adhesive. Hence, the invention is not to be considered as limited to the particular details given, nor to the specific application to which reference has been made during the description of the apparatus, except insofar as may be required by the scope of the appended claims.

What is claimed is:

1. In a vacuum frame of the type including a backing member having a smooth and continuous surface against which sheet materials or the like are to be pressed under the influence of a vacuum source, a vacuum mat comprising an envelope member of flexible material having two opposing faces, one of said faces being adapted to be placed against such surface and having a plurality of apertures therein, said envelope member being hermetically sealed except at said apertures, a resilient compression member of porous material lying within said envelope member and substantially filling same, said compression member being thicker at its periphery than at its center, and a fluid conduit communicating with said envelope member and being adapted to be connected to such vacuum source, whereby a vacuum may be drawn between such smooth surface and the other of said faces of said envelope member.

2. A vacuum mat in accordance with claim 1, wherein many of said apertures are positioned around the periphery of said one face, being significantly spaced from said periphery.

3. A vacuum frame for sheet materials and the like, comprising a backing member having a smooth and continuous surface against which such sheet materials are to be pressed in intimate relation, a vacuum mat including an envelope member of flexible material having two opposing faces, a plurality of apertures in one of said faces, support means for positioning said envelope member adjacent said backing member whereby said apertured face of said envelope contacts said surface, said envelope member being hermetically sealed except at such apertures, a resilient compression member of porous material lying within said envelope member and substantially filling same, said compression member being thicker at its periphery than at its center, and a fluid conduit communicating with said envelope member and being adapted to be connected to a vacuum source, whereby a vacuum may be drawn between said surface of said backing member and the other of said faces of said envelope member.

References Cited in the file of this patent

UNITED STATES PATENTS

| 654,421 | Soltmann | July 24, 1900 |
| 683,059 | McCaslin | Sept. 24, 1901 |

FOREIGN PATENTS

| 344,452 | Germany | Nov. 22, 1921 |